United States Patent
Dawson et al.

(10) Patent No.: US 6,311,213 B2
(45) Date of Patent: *Oct. 30, 2001

(54) SYSTEM AND METHOD FOR SERVER-TO-SERVER DATA STORAGE IN A NETWORK ENVIRONMENT

(75) Inventors: Colin Scott Dawson; Barry Fruchtman; Harry Clayton Husfelt; Michael Allen Kaczmarski; Don Paul Warren, Jr., all of Tucson, AZ (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/247,576

(22) Filed: Feb. 2, 1999

Related U.S. Application Data

(63) Continuation of application No. 09/179,743, filed on Oct. 27, 1998.

(51) Int. Cl.[7] .................................................... G06F 15/16
(52) U.S. Cl. ........................................... 709/217; 709/219
(58) Field of Search .................................... 709/201, 203, 709/208, 217, 218, 219, 211, 212, 216; 707/202, 204, 200; 714/4

(56) References Cited

U.S. PATENT DOCUMENTS

| | | | |
|---|---|---|---|
| 5,495,607 | 2/1996 | Pisello et al. | 395/600 |
| 5,564,040 | 10/1996 | Kubala | 395/497.04 |
| 5,603,019 | 2/1997 | Kish | 395/621 |
| 5,606,719 | 2/1997 | Nichols et al. | 395/876 |
| 5,617,540 | 4/1997 | Civanlar et al. | 395/200.11 |
| 5,623,605 | 4/1997 | Keshav et al. | 395/200.17 |
| 5,673,265 | 9/1997 | Gupta et al. | 370/432 |
| 5,678,042 | * 10/1997 | Pisello et al. | 709/201 |
| 5,832,522 | * 11/1998 | Blickenstaff et al. | 707/204 |
| 5,873,103 | * 2/1999 | Trade et al. | 707/204 |
| 5,925,119 | * 7/1999 | Maroney | 710/26 |
| 6,023,709 | * 2/2000 | Anglin et al. | 707/204 |
| 6,049,848 | * 4/2000 | Yates et al. | 711/4 |
| 6,101,508 | * 8/2000 | Wolff | 707/218 |
| 6,119,208 | * 9/2000 | White et al. | 711/162 |
| 6,185,601 | * 2/2001 | Wolff | 709/203 |

* cited by examiner

*Primary Examiner*—Mehmet B. Geckil
(74) *Attorney, Agent, or Firm*—Dan Hubert & Assoc.

(57) ABSTRACT

A system and method for storing data in a network computing environment. The network includes a source server that will receive data to be stored from a client and target servers that have locally attached physical storage media. A server-to-server protocol is used to establish a communication connection between the source server and target server while programming allows the storage of the data from the source server on the physical storage at the target server, while also creating a virtual volume at the source server on which the data is also stored. From the perspective of the client, the data appears to be stored at the source server on locally attached storage media. The present invention eliminates the requirement for actual physical media locally attached to the source server.

29 Claims, 4 Drawing Sheets

SYSTEM AND METHOD FOR SERVER-TO-SERVER DATA STORAGE IN A NETWORK ENVIRONMENT

This application is a continuation of Ser. No. 09/179,743 filed Oct. 27, 1998.

CROSS REFERENCE TO RELATED APPLICATIONS

This application is a Continuation of U.S. Pat. Appl. 09/179,743, filed on Oct. 27, 1998.

FIELD OF THE INVENTION

The present invention pertains to the field of data storage. More particularly, this invention pertains to a method and apparatus that allow the storage of a data set at a source server on a virtual volume, while facilitating the storage of the actual data from the data set at a physical volume at a target server using a server-to-server protocol.

BACKGROUND OF THE INVENTION

In a typical network computing environment, a hierarchy of servers often exists that are networked together. While this hierarchy of servers may be as few as two servers, it can also involve many servers. These servers are often located in physically unique locations. In a network, a server represents the application code (hosted on server computer) that runs on an operating system and a client (hosted on a client computer) represents the code run in any number of different applications that can run on many different operating systems. A client application can interface with the server to backup or archive data on the server machine.

In a network computing environment, copying the data is performed in order to protect the data files from corruption on the local client computer's hard drive, accidental deletion of a file, and other problems. A storage system between the servers on the network can back-up and store the data, and can also manage the data stored in the volumes. In standard networks having a number of levels of interconnected servers, the volumes are typically physical volumes, such as disk drives or tape drives, that are locally attached to each server. These locally attached storage devices must be maintained and managed at each unique location.

This traditional model of a storage system in a computer network has limitations in the fact that it is administratively burdensome to have operators at each server site to maintain the physical volumes. While the cost per megabyte of storing data in physical tape libraries is relatively inexpensive compared to other storage media, the maintenance and administration of tape libraries may be costly. Examples of some administrative tasks would be managing the inventory of tapes within the library including removing full tapes from the library, cleaning drives, adding additional scratch tapes to the library, and other routine maintenance tasks. Reducing the number and locations of physical storage media would reduce both the complexity and cost of this administration and maintenance.

SUMMARY OF THE INVENTION

The present invention provides an improved data storage system between servers in a network that substantially eliminates or reduces disadvantages and problems associated with previously developed systems and methods used for network data storage.

In one embodiment, the present invention provides a system for storing data in a computing environment network using virtual volumes, network communications and a server-to-server protocol. The system includes source servers (or local client servers) that have data that needs to be stored. The network also includes target servers at a single physical location (though the target servers could be located at multiple sites) that have locally attached physical storage media. The system uses a server-to-server protocol layered on the network protocol to store the data from the source server on one or more storage volumes at the target server, while also creating a virtual volume for "storing" the data at the source server. The target server and its physical storage appear, due to the creation of a virtual volume for storing the data, in all respects to be a locally attached storage media from the perspective of a client storing data at the source server. The present invention eliminates the requirement for actual physical sequential media attached to the source server.

The present invention provides an important technical advantage by allowing the consolidation and/or sharing of data storage resources.

The present invention provides an important technical advantage by storing data from a source server at both a virtual volume at the source server and a physical volume at a target volume so that to all outward appearances the data is stored in storage media locally attached to the source server.

The present invention provides another technical advantage by improving disaster recovery when a branch office source server and its locally attached physical storage volumes are destroyed or damaged because the backed up data is recoverable from a physical storage volume at the target server.

The present invention provides yet another technical advantage by reducing the amount of maintenance of physical storage media, such as tape libraries, at branch office locations.

The present invention provides another technical advantage by reducing the risk of lost or damaged data and storage devices and easing the maintenance requirements due to storing data at a central location.

The present invention provides the capability for administration of all real physical storage devices at a central location in a network while maintaining the functional characteristics, convenience, and capabilities of locally attached sequential storage media at each source server.

BRIEF DESCRIPTION OF THE DRAWING

For a more complete understanding of the present invention and the advantages thereof, reference is now made to the following description taken in conjunction with the accompanying drawings in which like reference numerals indicate like features and wherein.

DETAILED DESCRIPTION OF THE PREFERRED EMBODIMENT

In a network computing environment, there can be a hierarchy of servers. For example, in a typical corporate environment, there may be corporate level servers at the computing headquarters of the corporation and regional offices of the corporation that also have local servers. The hierarchy may extend further to branch offices underneath the regional offices that also have local servers. All of these servers are connected by means of a network. In such a network, there is usually a need to store data at each server site. The present invention provides a general scheme for taking data that needs to be stored at any of the local (or source) servers and storing the data on a target server's physical storage volume (for example, at the corporate computing headquarters), while also "storing" the data on a virtual volume at the source server. Thus, to all outward appearances, the data is stored at local storage attached to the source server, when in reality the actual data is stored on a physical volume remote from the source server. The present invention uses a server-to-server storage protocol layered onto the network protocol to implement the virtual volume(s) on the source server and to actually store the data on the target server. In one embodiment, the present invention is applicable to a network that includes an Adstar Distributed Storage Manager (ADSM) server, an IBM product, for managing the storage and back up of data in physical storage media. It should be understood that the present invention is applicable to any computing environment that interconnects servers and stores data between these interconnected servers.

Figure 1:
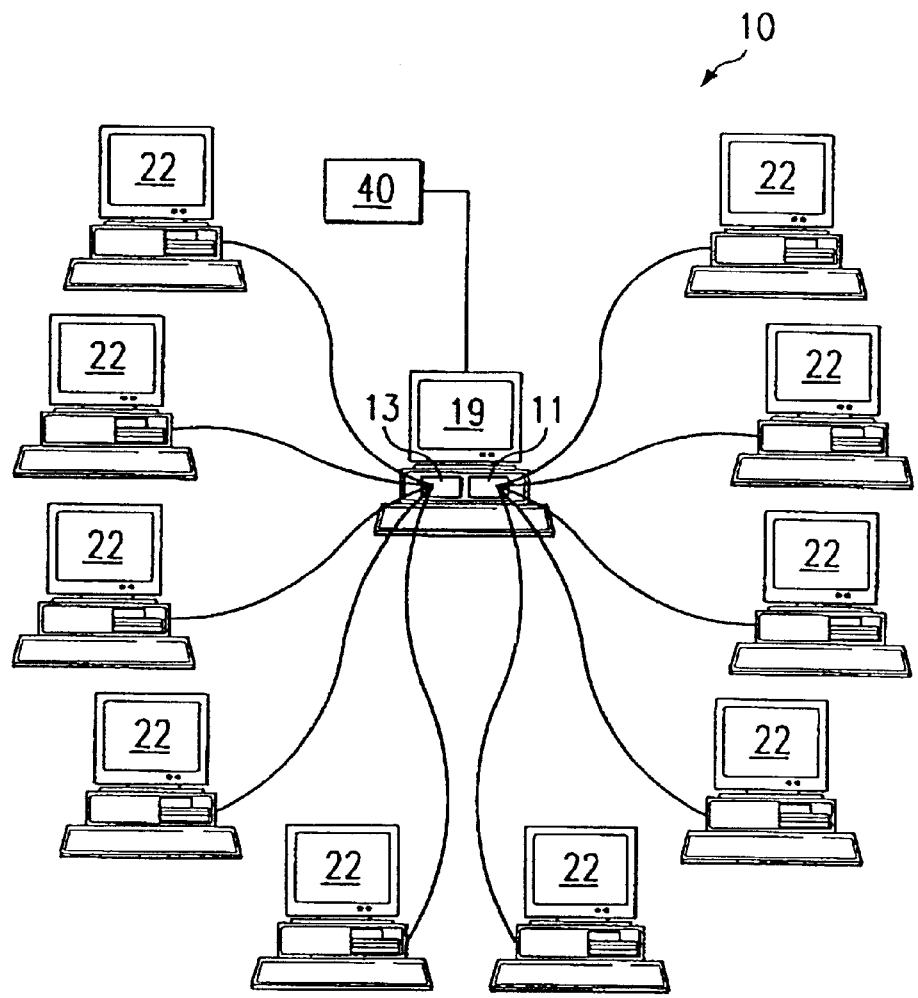
FIG. 1 shows a network of interconnected nodes (or computers)

FIG. 1 shows the interaction of a subset of nodes, or computers, on a network 10. Each node at any point in time, is running either a server application or client application depending on the particular operating system and how the network 10 is configured. The different nodes pass data back and forth to each other. In FIG. 1, storage node 19 is used to backup and archive data from the other 10 nodes, which are clients 22. As shown in FIG. 1, storage node 19 has two servers 11, 13 installed, with each server supporting five of the clients 22. The storage node 19 also has a tape library 40 attached to it. In some circumstances, the tape library 40 may only be able to be used by a single server, for example server 11, on the storage node 19. The present invention provides a means for the second server 13 to use tape library 40 by designating the second server 13 as a source server and the first server 11 as a target server. After the necessary configuration is completed between the source and target servers, as will be described more fully herein, the source server will be able to store data on the target server and thus utilize the tape library. In this way, the present invention provides a means for both consolidating resources (only one server has to be set up to directly access the tape library 40) and for sharing resources so that both server 11 and server 13 on the ADSM node 19 can access the tape library 40.

Figure 2:
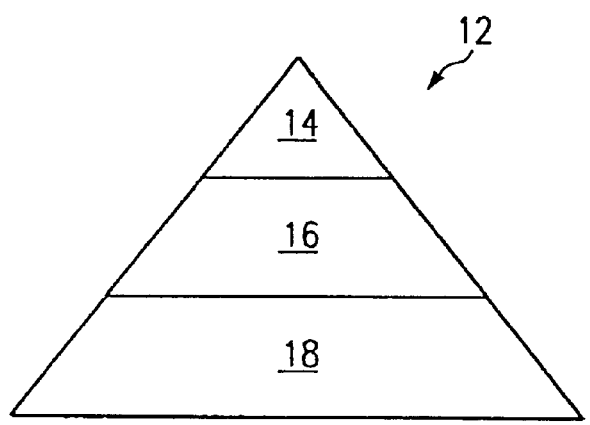
FIG. 2 shows a hierarchy of storage media.

Each server has a storage hierarchy that includes different types of physical storage media that are categorized based on speed and cost. FIG. 2 shows a storage hierarchy 12 where the upper level 14 represents the fastest and the most expensive storage media, such as local disk storage and locally attached hard drives. The next storage level 16 generally represents a slightly slower and less expensive optical tape or tape drive. The lowest level 18 is the least expensive and slowest optical tape, such as that used in optical tape libraries containing sequential media.

Network storage management servers are used to store data and allow users to configure this storage hierarchy in any number of ways. The user can provide some parameters, such as resources including number and type of tape drives, space on a particular disk drive, etc. and the network storage management server will manage where the data is stored and how to most efficiently move data from one media to another in order to maintain enough space on various storage media. The data stored can include a client back-up of a locally attached hard drive, which can be an image of the entire hard drive, or alternatively, specific directories.

Figure 3:
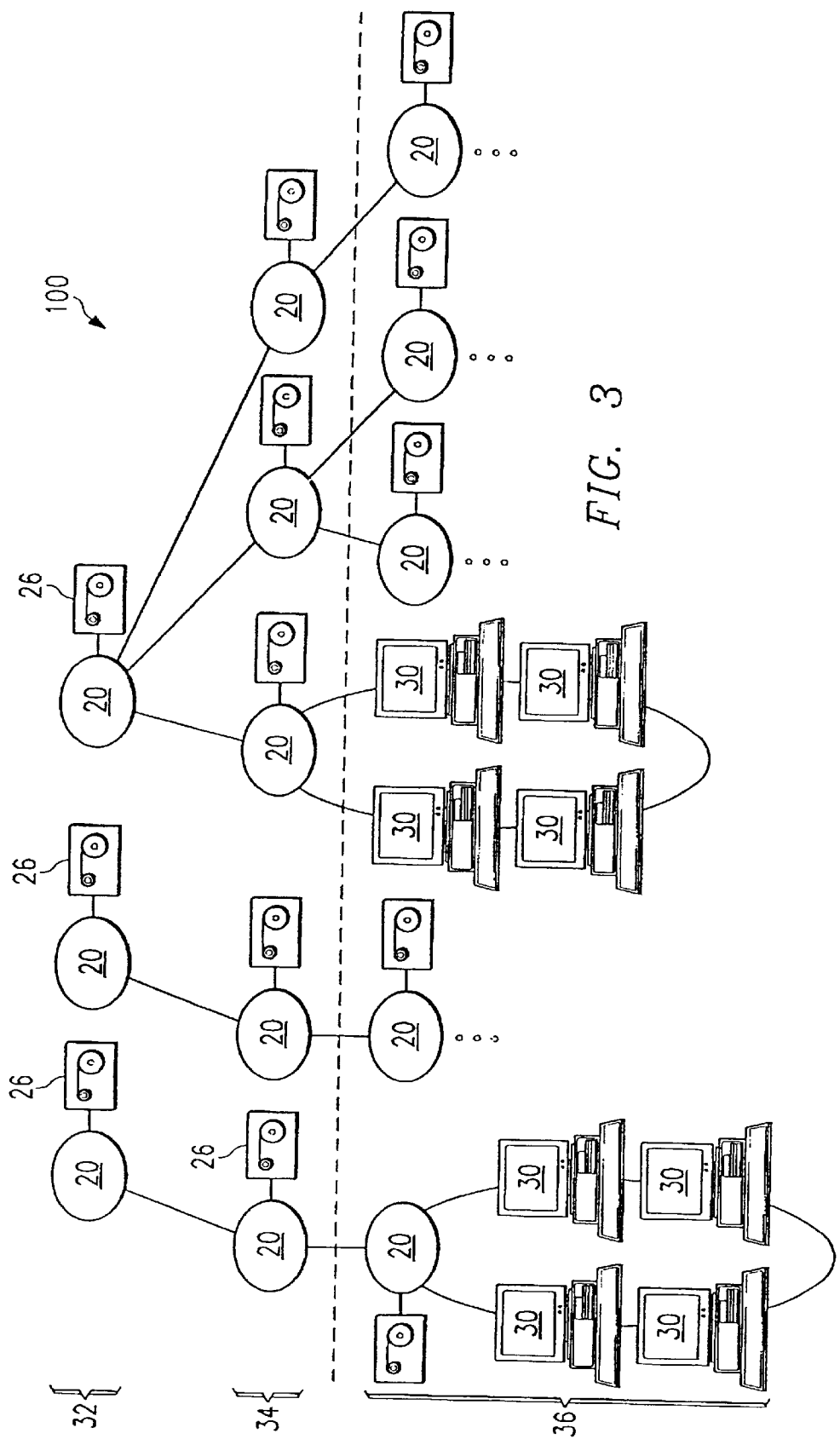
FIG. 3 shows a storage network that utilizes locally attached physical storage media.

FIG. 3 shows an example of a "branch office model" network 100 having a hierarchy of servers including a corporate level of servers 32, a regional level of servers 34, and a local level of servers 36. Each level of servers may have multiple servers 20 (for example, corporate level of servers 32 is shown having three servers 20). A physical volume 26, for example a tape drive or a tape library, is shown locally attached to each individual server 20.

Each server 20 in FIG. 3 services some number of clients 30 (shown attached to one server 20 at the regional level 34 and the local level 36). Each server 20 may have different storage needs, and in order to have enough storage to service all of the client's storage environment, storage devices 26 are generally locally attached to each server 20. While locally attached storage devices 26, such as tape drives, can work well in that they are relatively inexpensive storage media and can store significant amounts of data, they are administratively cumbersome. In the storage environment of FIG. 3 having locally attached tape libraries 26 at each local and regional server 20, an administrator must manage each server's tape library at each server site. In the branch office network 100 of FIG. 3, the management of the data storage facilities requires resources and people with the expertise to actually manage all the tape drives in addition to keeping track of these tapes, the actual media, across all the different servers 20. This, for example, includes basic maintenance such as making sure the tape does not get damaged environmentally to more sophisticated maintenance and tracking such as determining when the tape libraries are becoming full.

The present invention uses virtual volumes and a server-to-server protocol to allow the various branch office servers to define various attributes, including device class, for a locally attached virtual volume. The server-to-server protocol of the present invention manages the transfer of information and data between servers in the network. This server-to-server protocol is another "layer" above the actual network protocol used to connect the servers in the computer network. In one embodiment, the server-to-server protocol is implemented using TCP/IP as the network protocol. However, because the server-to-server protocol is at the level of the application, rather than the network level, the present invention can implement the server-to-server protocol in networks other than those using TCP/IP.

Figure 4:
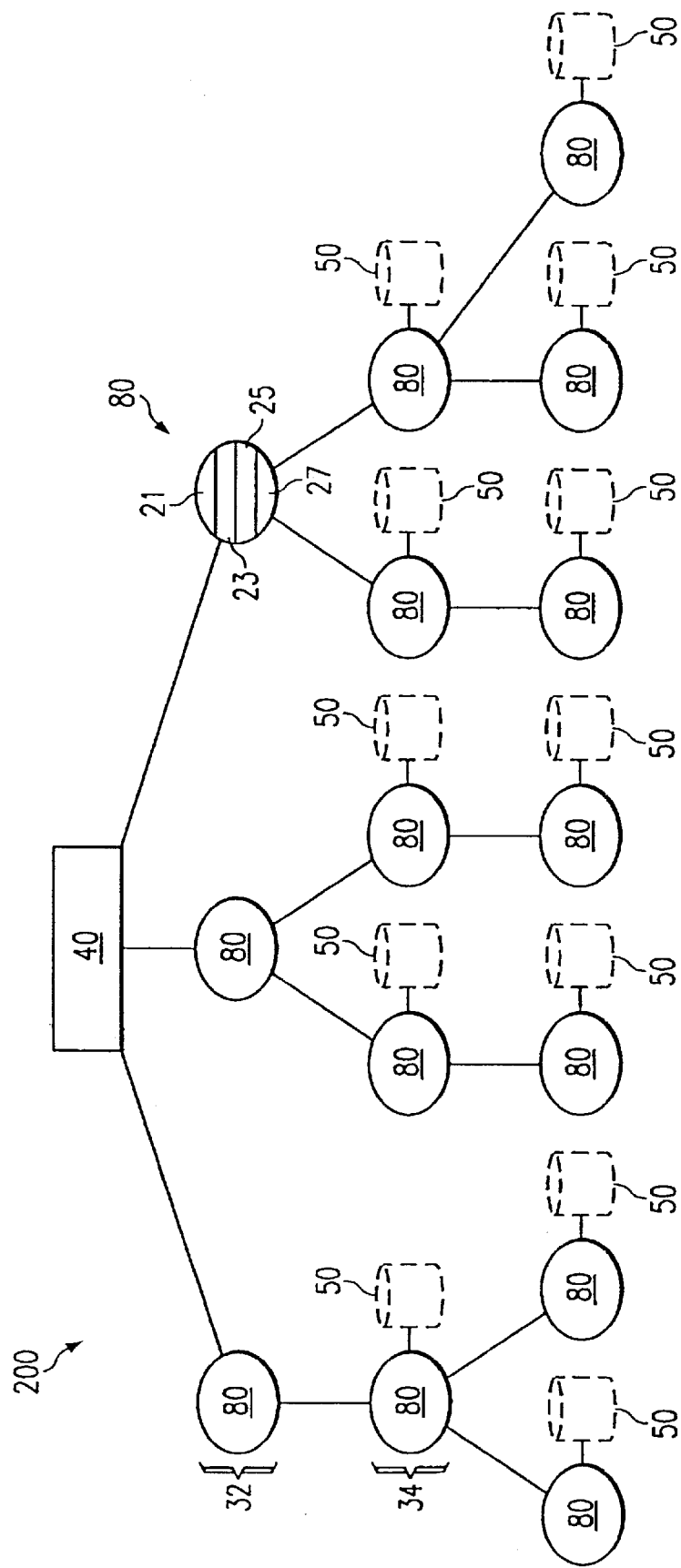
FIG. 4 shows a storage network utilizing local virtual storage media and a central physical storage facility according to the teaching of the present invention.

FIG. 4 shows a branch office model network 200 that is similar to that of FIG. 3, but incorporates the storage server 80 and virtual volume storage to overcome limitations presented in the FIG. 3 network. The storage server 80 of the present invention includes a network communications manager 21 that controls communication to and from defined and available network interfaces, a meta-data storage manager 23 that controls the management and storage of meta-data for server operations (including the storage of metadata describing client data) and a data storage manager 25 that controls the management and storage of actual data from clients defined to the storage server 80. The storage server 80 can also include other functional components 27 that provide standard storage server functionality.

As shown in FIG. 4, the network 200 once again includes corporate level 32, regional level 34, and local level 36 with servers 80 at each level. However, unlike FIG. 3, locally attached physical storage devices 26 (such as tape drives or tape libraries) are replaced with virtual volumes 50 locally attached to each server 80 at the regional and local levels. During operation, rather than storing data at the locally attached physical storage media 26 (as in FIG. 3), the data is actually stored in a tape library 40 at the corporate level 32, while the data appears to be stored locally using a virtual volume 50.

For the present invention, the attributes defined for the virtual volume can be the same attributes as would be defined for the previously locally attached physical storage devices such as the tape drives and tape libraries. In this definition process, instead of storing data at a locally attached physical storage volume, the present invention actually sends the data to be stored to another server (the target server). The virtual volumes 50 can have the same storage characteristics as the physical storage media 40.

With reference to FIG. 4, if a server 80 at the local level 36 needs to store data, the data would be sent through a regional server 80 at level 34 to corporate level 32 and physically stored in tape library 40. It should be understood that the data could also be stored at the regional level 34 in a tape library. One purpose of the invention is to physically store data in fewer locations while maintaining the appearance of local storage at each server. Using the present invention, instead of having numerous different branch offices having their own locally attached tape libraries, the data can be centralized at one or a few locations. However, even though the data is stored remotely at a central location, each branch office server logically acts as though it has a locally attached tape drive. The branch office servers may be going to regional office servers, which may or may not have locally attached tape drives or tape libraries, or the regional servers may also just be pointing to the corporate level servers and the locally attached tape library at the corporate level.

Figure 5:
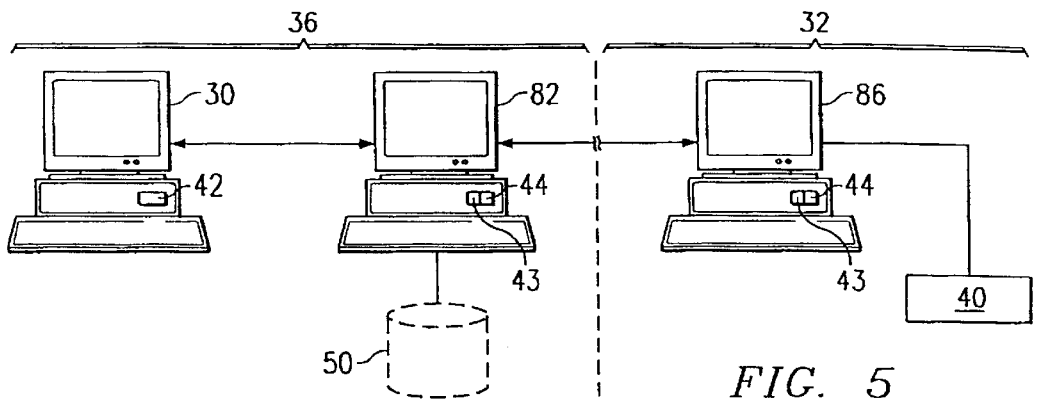
FIG. 5 shows an embodiment of the data storage system of the present invention.

FIG. 5 illustrates a client 30 using the data storage method of the present invention to store data at a source server 82 at local level 36. The present invention sends the data through a regional server (not shown) to target server 86 at corporate level 32. It should be understood that at any target server receiving data from a source server, the target server may store the data on a physical storage media attached to that target server, on actual sequential media devices attached to that target server, or it may store the data in virtual volumes. In the latter case, the target server would then become a source server, and would send and physically store the data to yet another target server.

When client computer 30 at local level 36 requires the back-up of its local hard drive, the client application software 42 communicates that need to source server 82. Source server 82 has virtual volume allocation software program 43 that sets up a communication connection to target server 86 at corporate level 32. In order to store the data from the client 30, an allotment of storage space at the target server 86 must be made. The source server 82 will request an allotment of space from the target server 86 for a defined size of a virtual volume 50. The size of the virtual volume 50 for the present invention is an attribute of the device class defined on the source server 82 (the size of the requested allotment is based upon a configuration parameter on the source server 82 relating to the virtual volumes 50). The target server 86 will reply that the space does or does not exist, and if it does, the client 30 data gets stored at the target server 86. The target server 86 may or may not store the data directly to tape library 40 depending on the storage management policies at the target server 86. For example, the data may first be stored to disk, and then later migrated to tape on the tape library 40. It should be understood that when a client 30 connects to a source server 82, the steps of requesting space at the target server 86, responding that space is available at the target server 86, and the client 30 transferring data all happen on a file by file basis. Thus, the client 30 data storage occurs on a file by file basis.

At the same time, the data is "stored" on virtual volume 50. In order to retrieve data that was stored during this operation at a later time, the client application will contact the source server 82 to recover the files. The source server 82 will open a communication channel to target server 86 that will retrieve the files from their location in tape library 40 and send this data back to source server 82. In this way, the present invention provides storage at the source server 82 on a virtual volume 50 while the data is actually stored in tape library 40 at target server 86. Virtual volume 50 is a logical volume that appears to the client 30 as any other physical sequential storage media. The virtual volumes 50 are represented as file objects to the target server 86. The virtual volume 50 is created and maintained in the metadata stored on the source server 82. It should be understood that both the source and target servers can provide data storage services to other clients in the network using protocols other than the server-to-server virtual volume protocol of the present invention.

The present invention transfers the data from the source server 82 to the target server 86 over the network using a network protocol such as TCP/IP. It should be understood that other communication protocols can be used to create and store data in the source server virtual volumes as taught by the present invention. The present invention simply requires implementation using a communications protocol at the source and target servers that will allow a connection to be established between the source and target servers. When recovering the data from target server 86, the source server 82 will establish the connection to target server 86, and using a server-to-server protocol, will send a request defining the attributes of the data to be recovered. The attributes of the data are stored in a metadata file on the source and target servers. The metadata is selected information, such as which source server sent the data and what version of the data is currently being stored, that is used to track the actual file data at the target server. Thus, when the client 30 sends the data to be stored to source server 82, the client passes a "verb" that contains a number of attributes, or metadata, with the actual file data to be stored. A database of verbs or metadata is maintained at the source server 82 that tracks where the data was stored.

The following example further illustrates the metadata used according to the present invention. Client "A" backs up data to source storage server "SUPER". Source storage server SUPER stores the data in virtual volumes, while physically storing the data on target storage server "FRED". Target server FRED allows source server SUPER to contact it as "CLIENT_SUPER" for data storage purposes. Source server SUPER stores this metadata that tracks which files are stored for client A. Source server SUPER also stores information about the virtual volume which includes: (i) the virtual volume name; (ii) the layout of the actual client data in the virtual volume; and (iii) where the virtual volume is stored. Target server FRED stores metadata tracking which files are stored on behalf of CLIENT_SUPER. As a result, target server FRED knows the data for CLIENT_SUPER represents virtual volume data, however server FRED does not know what client data was stored by server SUPER stored in the virtual volume(s) at source server SUPER.

Figure 6:
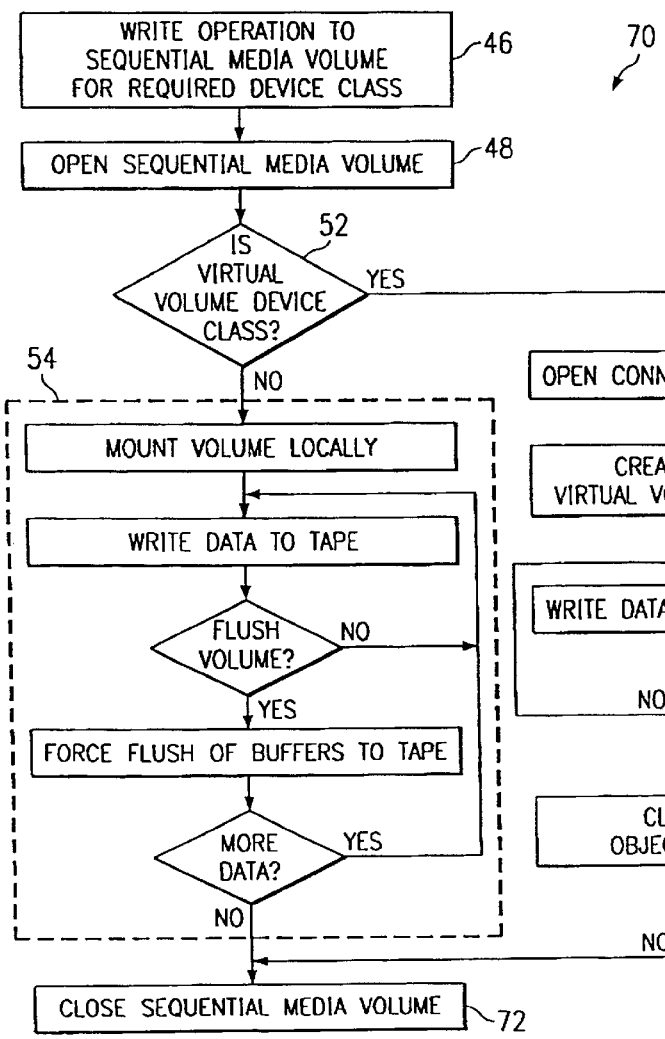
FIG. 6 shows an embodiment of the data storage method from a source server to a target server according to the present invention.

FIG. 6 is a flow chart of one embodiment of the authentication and data transfer protocol 70 of the present invention at the point the data storage request has been received at the source server 82. The authentication and data transfer protocol is contained in software programing 44 contained in a computer readable medium at both the source and target servers. The authentication and data transfer protocol controls the interaction between the servers, manages the data transfer between the servers, and deletes the data when no longer needed.

At step 46, a write operation request is received at the source server 82 from the client 30 that requests the storage of some data on sequential storage media at the source server 82. The write operation request will contain the source server communication attributes and other virtual volume attributes to use to write the data successfully. In an ADSM storage management system, the write operation will include the device class and other ADSM-specific processing overhead for managing storage volumes. At step 48, from the device class information (or metadata information), the source server 82 will initiate the process of opening the sequential storage volume in order to store the data. At step 52, the source server 82 determines whether the locally attached storage medium is a virtual or a physical volume. If the storage medium locally attached to the source volume 82 is a physical volume, the process flows to step 54, which represents a standard physical volume storage process (that can include the steps of mounting the local physical volume, writing the data to the physical media, and flushing the volume and forcing the flush of buffers to the physical media as necessary to store the data on the physical volume). If the storage volume locally attached to the source server 82 is a virtual volume the present invention will, at step 56, open the communication connection between the source server 82 and the target server 86. Step 56 includes requesting a certain amount of storage space at the target server 86. If that amount of space does not exist at the target server 86, then the communication channel is not opened and it will appear to the client as if the source server did not have enough available space for the data. At step 56, the source server 82 logically opens a virtual storage volume while at the network level a communication connection is being opened between the source server 82 and the target server 86 using the appropriate server-to-server protocol. If at step 56 the communication channel is successfully opened to the target server 86, the virtual volume at the source server 82 would also be successfully opened. After the connection has been established, a file object is created and opened at the target server 86 in order to store the actual data at step 58. This file object also includes the metadata or verb (for the virtual volume) that tracks where the files to be stored came from and what the data is, while at the same time allocating space on the physical storage 40 attached to the target server 86 in order to store the data. The metadata created will contain the appropriate pointers in the overhead to designate where the data is stored both on the virtual volume and the physical volume and correlates these so that the data can be recovered. The source server 82 then writes some portion of data to the created file object at the target server 86 at step 62. Depending on the size of the data files to be stored, the source server will periodically perform a flush volume at step 64 in order to ensure the data that has been written from the source server 82 and stored in buffers is written to the storage device. If a flush volume has not occurred, then the data will continue to be written to the same file object. If a flush volume is performed, then at step 66, the created file object is closed on the target server 86. By doing a flush volume, at the source server 82 the transaction is closed. In order to ensure the data gets written and the information needed to track the data is maintained in the overhead information, the current file object must be closed. If there is more data to process, at step 68, then another file object will be opened at step 58 from the sequence of files that represents the virtual volume. At the point that there is no more data to process (i.e., all of the data to be stored has been written from the source server 82 to the target server 86), then the close processing step 72 is performed. In the case of virtual volume storage according to the present invention, at the close sequential media volume step 72, the communication channel that was opened at step 56 will be closed.

The present invention uses a server-to-server virtual volume command interface protocol within a storage server to accomplish the data transfer and storage as described herein. For certain storage management systems, for example ADSM, the present invention simply adds certain functionality to the existing application protocol. The server-to-server virtual volume command interface can be implemented as a software program that resides on the source and target servers. The server-to-server virtual volume command interface provides the interface to allow a user to define various attributes to enable the data storage at a virtual volume locally and at a physical volume at the target server. The server-to-server command interface can include a source server command interface, a target server command interface, an authentication and data transfer software program, a reconciliation software program, and a security and access control program. These software programs can reside at one or both of the source and target servers.

The source server command interface can be executed by the user to define the virtual volume device to the source server. This source server command interface allows the issuing of configuration commands, including a define server command that will initially create the communication attributes necessary to allow the source server to communicate with the target server. The source server command interface will then allow the user to define the virtual volume to include the size of the virtual volume, how many virtual volumes exist at the source server, as well as referring to the server connection definitions required to establish the communication connection. The source server command interface can also provide a virtual volume naming convention to allow for the validation of volume names for both user defined volume names and server generated names for volumes that are scratch allocated.

The target server command interface is used to define the source server as a special type of network client to the target server. The target server command interface allows the user to designate the number and names of any source servers allowed to use a particular server as a target server. The source server will be registered by the target server as a client when the source server contacts the target server to store the data. The target server command interface also establishes storage space at the target server for where file data from the source server(s) should be stored, including a the specification of a physical volume storage pool where the data should reside, and the type of device(s) the data will reside upon. Furthermore, the definition of the data storage space can provide storage space for specific archive type data from the specialized network (ADSM) client.

The authentication and data transfer software program is used to establish the communications connection between the source server and the target server. This authentication and data transfer software program provides an interface to the specific network communications method that may be used to transfer the data between servers and the data transfer definitions for sending and receiving data between the two servers. For the source server, authentication and data transfer software program provides for the storing of the data to a virtual volume which has the characteristics and behavior of a sequential storage device to the source server, while sending the data to the target server in a one to many file format. Specifically, as shown in FIG. 6, a file object is logically opened at the beginning of a data transfer operation between the servers, and when the source server reaches a transaction processing boundary, the current file object is closed and the next file object is opened. In this way, the data is aggregated on the source server into files for transmission to the receiving target server using the server-to-server protocol. For the target server, the authentication and data transfer software program stores the data in the server's storage as a file or files on the target server. The deletion of these files is controlled by the source server.

The reconciliation software program synchronizes the virtual volume definitions on the source server with the actual data storage location on the target server. The reconciliation software program provides a record of where on the source virtual volume the data is represented as being stored for use by the client application. This record is correlated to the actual location of the data on a physical storage media at the target server. When the client application attempts to retrieve the stored data from the virtual volume, the source server uses this record to find the actual data stored at the target server in order to retrieve the data.

A two-level security and access control negotiation program can be used to control access using both an access verification key and password authentication. An access verification key identifies the source server to the target server in order to control data between the source server and the target server. The verification key is managed by the source and target servers. If the source server does not report a valid verification key to the target server, the source server is not allowed to store data on the target server. In addition, a password authentication step provides administrative control of the data for server administrators by allowing the setting of passwords between the source server and target servers.

In one embodiment, the present invention can be utilized in conjunction with an ADSM system having an ADSM storage server. The ADSM server provides backup, archive, and space management services to ADSM clients or the ADSM client API in a distributed computing environment. The ADSM storage server allows the user to define the server by specifying a name for the definition that references a set of attributes for the source server. In a TCP/IP scheme, there's a high-level (IP address or host name) and low-level qualifier (port). The definition also includes an alias that will be used by the server to communicate with the ADSM server. The user can also supply a password. The source server will contain an ADSM database of metadata which includes metadata information about clients and the data known to this server. The ADSM database can also store administrative information for the ADSM server (such as administrators allowed access, procedures for managing data, and storage devices that are locally attached). The define server command writes this information about the server into one of the ADSM database tables. This step of defining the server simply creates a set of attributes that will be used during the data storage function (these attributes allow the source server to establish connectivity to the target server at some point in the future).

The ADSM server then allows the user to define the virtual device class. For the source server to be able to use a storage device on the ADSM network system, the device class of the storage device must be defined. The device class will indicate the type of storage device and potentially other attributes associated with that storage media (such as how many drives does it has, the size, and other defining attributes). In one embodiment, the device class for the source server would be a "server" to distinguish it from a tape drive or other storage media. The "server" virtual storage media can appear as one big storage media, where the underlying physical storage media may be a plurality of physical disks supporting the virtual volume. The size of the virtual volume is actually constrained by the size of the available storage at the target server. Thus, the user may define any number of virtual devices, and can make those virtual volumes any size they want.

The user can now define the ADSM storage pool, where a storage pool is a collection of identical device class storage devices. When storing data, a storage pool can be used to allow a larger amount of data to be stored. The storage pool can be comprised of any device class; it may be a device class that is a virtual volume or a device class that is a physical volume. When using the present invention for client back-up of data, the user can define a storage pool on the source server which is basically a set of constructs in the source server that define which client is allowed to store data in the storage pool. For the present invention, a storage pool is created at the source server having a device class that is a virtual volume device class. The creation of a storage pool allows the ADSM server to manage the stored data and to implement a storage hierarchy between different storage pools. Various attributes are associated with each particular storage pool that allow a user to manage which storage pool collects each set of data (e.g., a storage pool may have a size attribute that requires any file larger than a certain size to be forced down to the next storage pool regardless of whether there is adequate space in the first pool).

In an alternative embodiment that is independent of a client application, a storage pool may not be required. For example to accomplish database backups, after the ADSM server performs define server and define device class operations, the database can simply be backed up in the specified device class. The method described in FIG. 6 is then used to store the database without use of a storage pool. Thus, for storage that is not related to client data back-up, the present invention does not require the establishing of a storage pool.

In the ADSM storage network embodiment, actual data storage begins as described earlier in FIG. 6. A client connects to and begins writing data to the source server. The source server will make a determination to write that data to a storage pool of a particular device class. If that disk storage pool fill up, the source server must start moving data in order to free up space in the disk pool. The source server may then start writing client data to an alternative storage pool (which may be a different device class) while flushing the disk space in the original disk pool. At the point the source server starts writing to the device class, the present invention queries the device class and, when using the present invention, the device class is a virtual volume. For a virtual volume, the source server reads the communication attributes previously established and establishes the communication connection to the target server using the ADSM protocol. After the connection is established using the ADSM protocol, a file object is opened. This step basically consists of a query that states a certain volume of data needs to be sent through and does the target volume have space to store that data.

If space is available at the target, the present invention moves to the data storage stages at both the target and source servers. The source server uses the reconciliation software to track where the data has been put on the virtual volume and sends the data to the target servers. Two distinct types of reconciliation occur using the present invention which can be performed by the server reconciliation software. Initially, during data storage from the source server to the target server, the source server is tracking 1) where the data is placed based upon the source server metadata that is maintained for the storage operation and 2) the success of the write requests to the target server. This metadata maintains the mapping of where the data is stored based upon how data storage is assigned and tracked on the source server as well as the naming conventions used to create the file objects on the target server on behalf of the source server. The reconciliation software can also include a specific reconciliation algorithm that is executed on the source server to reconcile the source server's metadata for virtual volumes with the actual files stored on the target server. This reconciliation algorithm processing verifies that the data files are stored on the target server, while also verifying that the metadata attributes for the virtual volume on the source are viable and complete.

The target server then performs a write operation to a device class. If the device class to which the target server will write is a virtual volume, then the data storage will follow steps 56 through 72 of FIG. 6 as described above. If the device class to which the target server will write is a physical volume, the data storage follows a sequence as described in step 54 of FIG. 6. For physical volume storage, the target server will determine the type of device and then store the data on the physical storage device while tracking where the data has been stored physically in the media.

The reconciliation program tracks the correlation between the source server data location and the target server data location on request of a user at the source server. In one embodiment of the present invention, the data is aggregated at the source server and sent to the target server as one object. The tracking of the individual file locations is done on the virtual volume at the source server. Thus, the target server will receive one file from the source server that may represent a number of files from the client. In order to retrieve one of the client files, the client will request that file from the source server. The source server will then access a program that will retrieve portions of the object that was sent to the target server. The retrieve program will identify from the position of the requested file on the virtual volume the position and number of bytes to retrieve from the target server and make that request. The source server will establish a communication connection and perform a set of queries to correlate the position of the data on the virtual volume to the position of the data on the target volume. Thus, the present invention will relate positions and files between the source and target servers. Essentially, the virtual volume from the source server is represented on the target server as some number of files that aggregate the data.

In summary, the present invention provides a data storage system and method for use in a network to improve the management of data storage. The source server can act as a specialized network client with respect to the target server. The data from a client is stored in a virtual volume on the source server, and in a one to many file format at the target server. The data from the source server may be stored by the target server on any physical storage device that the target server supports. During operation, a client application writes data to the source server as if the source server will store the data on locally attached sequential media, but the source server simply maps the data to make it look and feel like sequential media to the client application, while actually writing the data to the target server over the network. The present invention collects the data at the source server, surrounds it with identifiers, and sends it to the target server. It should be understood that the source server could send the data through several target servers before the data is actually stored in physical storage media.

Although the present invention has been described in detail, it should be understood that various changes, substitutions and alterations can be made hereto without departing from the spirit and scope of the invention as described by the appended claims.

What is claimed is:

1. A system for storing data in a computer network, comprising:

one or more target server applications stored on a computer readable medium at a target server;

one or more source server applications stored on a computer readable medium at a source server; and a source server stored on a computer readable medium at a source server computer; and a source server command interface operable to utilize metadata stored on the source server computer to define a virtual volume emulating a physical storage device at the source server;

a target server command interface operable to define the source server as a client to the target server;

wherein the source server computer executes the one or more source server applications to:

open a communication channel between the source server and the target server using a server-to-server protocol;

transfer data from the source server to the target server; and represent the data as being stored on the virtual volume.

2. The system of claim 1, wherein the source server computer further executes the one or more source server applications to:

a) create and open a file object at the target server;

(b) write a portion of the data to the file object;

(c) close the file object upon occurrence of a transaction processing boundary; and repeat (a)–(c) until the data has been entirely transferred.

3. The system of claim 2, wherein the source server computer further executes the one or more source server applications to:

use communication protocol specific attributes to establish the communication channel between the source server and the target server;

define attributes used to manage the data as the data is sent to the target server;

establish characteristics of the virtual volume; and manage how the source server will use the virtual volume to store the data.

4. The system of claim 2, wherein the data is stored on a physical storage volume coupled to the target server, said physical storage volume accessible exclusively by the target server.

5. The system of claim 2, wherein the source server and the target server each further comprises:

a network communications manager application that controls communication to and from defined and available network interfaces;

a metadata storage manager application that controls the management and storage of metadata for server operations; and a data storage manager application that controls the management and storage of the data.

6. A system for storing data in a computer network, comprising;

a target server;

a source server;

a source server command interface operable to utilize metadata stored on the source server computer to define a virtual volume emulating a physical storage device at the source server;

a target server command interface operable to define the source server as a client to the target server;

one or more server applications stored on the source server in a computer readable medium and one or more target server applications stored on the target server in a computer readable medium;

wherein the source server executes the one or more source server applications to:

open a communication channel between the source server and the target server using a server-to-server protocol;

transfer data from the source server to the target server; and represent the data as being stored on a virtual volume locally attached to the source server.

7. The system of claim 6, wherein the source server further executes the one or more source server applications to:

a) create and open a file object at the target server;

(b) write a portion of the data to the file object;

(c) close the file object upon occurrence of a transaction processing boundary; and repeat (a)–(c) until all the data has been transferred.

8. The system of claim 7, wherein the source server computer further executes the one or more source server applications to:

use communication protocol specific attributes to establish the communication channel between the source server and the target server;

define the attributes used to manage the data as the data is sent to the target server;

establish characteristics of the virtual volume; and manage how the source server will use the virtual volume to store the data.

9. The system of claim 7, wherein the data is stored on a physical storage volume coupled to the target server, said physical storage volume accessible exclusively by the target server.

10. The system of claim 7, wherein the source server and the target server each further comprises:

a network communications manager application that controls communication to and from defined and available network interfaces;

a metadata storage manager application that controls the management and storage of metadata for server operations; and a data storage manager application that controls the management and storage of the data.

11. A method for managing data storage interaction between a source server and a target server in a computer network, comprising:

defining the source server as a client to the target server;

receiving a write operation request at the source server from a client to request storage of a data file on sequential storage media at the source server;

opening a communication connection between the source server and the target server using a server-to-server protocol;

utilizing metadata stored on the source server to define a virtual volume emulating a physical storage device at the source server;

creating a file object at the target server that includes a virtual volume verb;

opening the file object on the target server for storing the data file; and writing data from the data file to the created file object at the target server to store the data file.

12. The method of claim 11, further comprising:

(a) storing a portion of the data file in at least one buffer at the target server;

(b) performing a flush volume of the at least one buffer;

(c) closing the created file object on the target server;

(d) if there is more data in the data file to process, opening another file object at the target server;

(e) repeating steps (a) through (d) as necessary in order to store all data from the data file at the target server; and closing the communication connection between the source server and target server.

13. The method of claim 11, wherein the write operation request includes a set of metadata for the data file.

14. The method of claim 11, further comprising storing the data file on a physical storage volume coupled to the target server, said physical storage volume accessible by the target server and inaccessible by the source server.

15. The method of claim 11, further comprising embedding a set of data file characteristics in the virtual volume verb, including a set of pointers to correlate a location where the data file is stored on the virtual volume to a location where the data file is stored at the target server.

16. The method of claim 11, further comprising; synchronizing a location of the data file on the virtual volume to a location of the data file on the target server.

17. The method of claim 11, further comprising:

defining the virtual volume within a device class to include a set of virtual characteristics for the virtual volume and to provide a naming convention for the virtual volume; and identifying a set of source servers operable to store data at the target server and designation of a storage pool at the target server for storing data from the source server.

18. The method of claim 11, further comprising:

establishing a set of data transfer definitions for sending and receiving data between the source server and the target server;

storing the data file to the virtual volume;

the creating, opening, and writing comprising:

(a) creating and opening a file object at the target server;

(b) writing a portion of data from the data file to the file object;

(c) closing the file object upon the occurrence of a transaction processing boundary; and repeating (a)–(c) until the entire data file has been transferred; and storing the data file at the target server; and defining a set of deletion attributes at the source server to control deleting the data file at the target server.

19. The method of claim 11, wherein the source server and the target server each further comprises:

a network communications manager application that controls communication to and from defined and available network interfaces;

a metadata storage manager application that controls the management and storage of metadata for server operations; and a data storage manager application that controls the management and storage of the data.

20. In a computing network environment, a system for storing data, comprising:

a source server;

a target server coupled to a target storage media;

a target server command interface operable to define the source server as a client to the target server;

a virtual volume created and maintained in a set of metadata stored on the source server, said virtual volume emulating a physical storage device at the source server;

a command interface operable to configure the source server to enable a transfer of data from the source server to the target server over the network using a server-to-server protocol while also representing the data as stored at a location on the virtual volume.

21. The system of claim 20, wherein the command interface is further operable to:

define the virtual volume at the source server;

define a set of communications attributes to establish a communication connection between the source server and target server; and define a storage pool for storing the data.

22. The system of claim 20, wherein the command interface is stored on a computer-readable medium and comprises:

a source server command interface operable to:

define a set of server-to-server protocol specific attributes used to establish a communication connection between the source server and the target server; and define the virtual volume at the source server when establishing a communication connection to the target server, the virtual volume having a set of characteristics emulating a physical storage device at the source server;

an authentication and data transfer software program to establish the communication connection and transferring the data between the source server and the target server; and a reconciliation software program to synchronize the location of the data on the virtual volume to the location of the data on the target server.

23. The system of claim 22, wherein the source server command interface is further operable to define the virtual volume within a device class to include a set of virtual characteristics for the virtual volume and to provide a naming convention for the virtual volume.

24. The system of claim 22, wherein the target server command interface is further operable to identify a set of source servers operable to store data at the target server and designate of a storage pool at the target server for storing data from the source server.

25. The system of claim 22, wherein the authentication and data transfer software program is further operable to interface with the server-to-server protocol to communicate between the source server and target server and further to establish a set of data transfer definitions for sending and receiving data between the source server and the target server.

26. The system of claim 25, wherein the authentication and data transfer software program is further operable to:

store the data to the virtual volume; and facilitate the transfer of the data to the target server, further comprising:

(a) creating and opening a file object at the target server;

(b) writing a portion of data from the data to the file object;

(c) closing the file object upon the occurrence of a transaction processing boundary; and repeating (a)–(c) until all of the data has been transferred.

27. The system of claim 26, wherein the authentication and data transfer software program is further operable to:

store the data at the target server as archive files; and define a set of deletion attributes at the source server to control deleting the archive files.

28. The system of claim 21, wherein the data is stored on a physical storage volume coupled to the target server, said physical storage volume accessible by the target server and inaccessible to the source server.

29. The system of claim 20, wherein the source server and the target server each further comprises:

a network communications manager application that controls communication to and from defined and available network interfaces;

a metadata storage manager application that controls the management and storage of metadata for server operations; and a data storage manager application that controls the management and storage of the data.

* * * * *

UNITED STATES PATENT AND TRADEMARK OFFICE
CERTIFICATE OF CORRECTION

PATENT NO. : 6,311,213 B2
DATED : October 30, 2001
INVENTOR(S) : Colin Scott Dawson et al.

Page 1 of 1

It is certified that error appears in the above-identified patent and that said Letters Patent is hereby corrected as shown below:

Column 12,
Lines 24 and 26, delete the word "and" at the end of that line.
Line 45, add a paranthetical -- ( -- at the beginning of the line before the letter "a".

Column 13,
Line 36, add a paranthetical -- ( -- at the beginning of the line before the letter "a".

Column 14,
Line 44, delete the semicolon following the word "comprising" and replace it with a colon -- : --.

Column 16,
Line 12, delete the word "of" between the words "designate" and "a".

Signed and Sealed this

Twenty-first Day of May, 2002

Attest:

Attesting Officer

JAMES E. ROGAN
Director of the United States Patent and Trademark Office